US012800140B2

(12) United States Patent
Pang et al.

(10) Patent No.: US 12,800,140 B2
(45) Date of Patent: Nov. 17, 2026

(54) METHOD AND SMART SYSTEM FOR FAULT DETECTION AND PREVENTION IN INDUSTRIAL BOILERS

(71) Applicants: Ningbo Nottingham New Materials Institute Co. Ltd, Ningbo (CN); University Of Nottingham Ningbo China, Ningbo (CN)

(72) Inventors: Cheng Heng Pang, Ningbo (CN); Tao Wu, Ningbo (CN); Yang Meng, Ningbo (CN); Yuxin Yan, Ningbo (CN); Yoong Xin Pang, Ningbo (CN); Xinyun Wu, Ningbo (CN)

(73) Assignee: University Of Nottingham Ningbo China, Ningbo (CN)

( * ) Notice: Subject to any disclaimer, the term of this patent is extended or adjusted under 35 U.S.C. 154(b) by 590 days.

(21) Appl. No.: 18/031,276

(22) PCT Filed: May 28, 2021

(86) PCT No.: PCT/CN2021/096976
§ 371 (c)(1),
(2) Date: Apr. 11, 2023

(87) PCT Pub. No.: WO2022/170698
PCT Pub. Date: Aug. 18, 2022

(65) Prior Publication Data

US 2023/0383943 A1 Nov. 30, 2023

(30) Foreign Application Priority Data

Feb. 10, 2021 (CN) ........................ 202110185098.2

(51) Int. Cl.
*F22B 35/18* (2006.01)
*G05B 23/02* (2006.01)
(Continued)

(52) U.S. Cl.
CPC .......... *F22B 35/18* (2013.01); *G05B 23/0283* (2013.01); *G06T 7/0004* (2013.01);
(Continued)

(58) Field of Classification Search
CPC ...... F22B 35/18; F22B 35/00; G05B 23/0283; G05B 23/0243; G06T 7/0004; G06T 7/11;
(Continued)

(56) References Cited

U.S. PATENT DOCUMENTS

2011/0204150 A1* 8/2011 Chapman ........... G05B 19/0428 236/94
2023/0359194 A1* 11/2023 Dickson ............. G05B 23/0254

FOREIGN PATENT DOCUMENTS

CN 108388149 A 8/2018
CN 109257417 A 1/2019
(Continued)

OTHER PUBLICATIONS

International Search Report of PCT/CN2021/096976.
Written Opinion of PCT/CN2021/096976.

*Primary Examiner* — Aditya S Bhat

(57) ABSTRACT

The present disclosure provides a method and intelligent system for recognizing and forewarning a fault of an industrial boiler. The method for recognizing and forewarning the fault of the industrial boiler includes: acquiring preset boiler monitoring parameter combinations; acquiring a segmentation time span corresponding to each of the boiler monitoring parameter combinations; acquiring a variation graph of all the boiler monitoring parameters in each of the boiler monitoring parameter combinations, and segmenting and fragmenting the variation graph of all the boiler monitoring parameters in a time sequence according to the segmentation time span to obtain fragmented images; using the fragmented images of all the boiler monitoring parameters within the same time period in each of the boiler monitoring
(Continued)

parameter combinations as a fragmented image combination to obtain a plurality of fragmented image combinations.

18 Claims, 6 Drawing Sheets

(51) Int. Cl.
*G06T 7/00* (2017.01)
*G06T 7/11* (2017.01)
*G06T 7/13* (2017.01)
*G06T 7/62* (2017.01)

(52) U.S. Cl.
CPC .................. *G06T 7/11* (2017.01); *G06T 7/13* (2017.01); *G06T 7/62* (2017.01); *G06T 2207/20021* (2013.01); *G06T 2207/20072* (2013.01); *G06T 2207/20081* (2013.01); *G06T 2207/20084* (2013.01)

(58) Field of Classification Search
CPC ... G06T 7/13; G06T 7/62; G06T 2207/20021; G06T 2207/20072; G06T 2207/20081; G06T 2207/20084; G06F 18/2431; G06F 18/214
USPC .......................................................... 702/183
See application file for complete search history.

(56) References Cited

FOREIGN PATENT DOCUMENTS

| | | | |
|---|---|---|---|
| CN | 109469896 | A | 3/2019 |
| CN | 209820523 | U | 12/2019 |

* cited by examiner

METHOD AND SMART SYSTEM FOR FAULT DETECTION AND PREVENTION IN INDUSTRIAL BOILERS

CROSS-REFERENCE TO RELATED APPLICATIONS

This Application is a national stage application of PCT/CN2021/096976. This application claims priorities from PCT Application No. PCT/CN2021/096976, filed May 28, 2021, and from the Chinese patent application 202110185098.2 filed Feb. 10, 2021, the content of which are incorporated herein in the entirety by reference.

TECHNICAL FIELD

The present disclosure relates to the technical field of boiler fault detection, in particular to a method and intelligent system for recognizing and forewarning a fault of an industrial boiler.

BACKGROUND ART

A boiler is an energy conversion device commonly used in daily life and is applicable to every aspect in the life, such as heating and power generation. An industrial boiler is high in energy consumption, noncentralized in distribution, difficult to supervise, low in thermal efficiency and poor in safety. Therefore, it is significant to design a comprehensive and accurate fault recognition manner for the industrial boiler. For an existing boiler device, a plurality of sensors are generally mounted on different positions of a boiler, real-time operation parameters of the boiler are detected, and whether the boiler has a fault is detected in real time by means of the operation parameters of the boiler. In such a fault recognition manner, faults which have occurred may be only detected, potential faults may not be recognized and predicted, and thus, the risk that the existing boiler device has a fault is higher.

SUMMARY

In order to solve the above-mentioned problem, the present disclosure provides a method for recognizing and forewarning a fault of an industrial boiler. The method for recognizing and forewarning the fault of the industrial boiler includes:

- acquiring preset boiler monitoring parameter combinations, wherein each of the boiler monitoring parameter combinations includes at least one boiler monitoring parameter, and each of the boiler monitoring parameter combinations corresponds to a fault type; acquiring a segmentation time span corresponding to each of the boiler monitoring parameter combinations;
- acquiring a variation graph of all the boiler monitoring parameters in each of the boiler monitoring parameter combinations, and segmenting and fragmenting the variation graph of all the boiler monitoring parameters in a time sequence according to the segmentation time span to obtain fragmented images;
- using the fragmented images of all the boiler monitoring parameters within the same time period in each of the boiler monitoring parameter combinations as a fragmented image combination to obtain a plurality of fragmented image combinations; and respectively inputting the plurality of fragmented image combinations to a preset fault diagnosis model to obtain fault diagnosis results output by the fault diagnosis model and corresponding to all the fragmented image combinations.

Optionally, the step of segmenting and fragmenting the variation graph of all the boiler monitoring parameters in a time sequence according to the segmentation time span to obtain fragmented images includes:

- using a sliding window to slide at a preset step length on the variation graph of all the boiler monitoring parameters in a time sequence, and segmenting a region selected by sliding the sliding window on the variation graph of all the boiler monitoring parameters every time into a fragmented image, wherein the width of the sliding window is equal to the segmentation time span.

Optionally, before the step of acquiring a segmentation time span corresponding to each of the boiler monitoring parameter combinations, the method further includes: acquiring data acquisition time intervals of all the boiler monitoring parameters in each of the boiler monitoring parameter combinations, and determining a first boiler monitoring parameter with the maximum data acquisition time interval in each of the boiler monitoring parameter combinations;

- determining the number of preset data acquisition points of the first boiler monitoring parameter in each of the boiler monitoring parameter combinations; and determining the segmentation time span corresponding to each of the boiler monitoring parameter combinations according to the data acquisition time interval of the first boiler monitoring parameter in each of the boiler monitoring parameter combinations and the number of the preset data acquisition points.

Optionally, the method for recognizing and forewarning the fault of the industrial boiler is applied to an intelligent system for recognizing and forewarning a fault of an industrial boiler, the intelligent system for recognizing and forewarning the fault of the industrial boiler includes a plurality of detection models, the plurality of detection models include the fault diagnosis model and a slagging/scaling evaluation model, and the method for recognizing and forewarning the fault of the industrial boiler further includes:

- acquiring a mineral composition of a to-be-recognized fuel and operation time of the boiler; and
- inputting the mineral composition of the to-be-recognized fuel and the operation time of the boiler to the slagging/scaling evaluation model, and outputting, by the slagging/scaling evaluation model, a geometric form of ash deposition of the to-be-recognized fuel, wherein the geometric form of the ash deposition includes at least one of a height, a width, an area and a length-to-width ratio.

Optionally, before the step of acquiring a mineral composition of a to-be-recognized fuel and operation time of the boiler, the method further includes:

- acquiring a mineral composition of a fuel used for the boiler;
- acquiring an image acquired from each heat exchange surface pipeline of the boiler every other preset time;
- detecting an edge of the image acquired from each heat exchange surface pipeline every other preset time to obtain a binary image of an ash deposition form, and acquiring the geometric form of ash deposition based on the binary image of the ash deposition form; and
- training the slagging/scaling evaluation model by taking the mineral composition of the fuel, the operation time of the boiler and the corresponding geometric form of the ash deposition as training data until a loss function of the slagging/scaling evaluation model is converged.

Optionally, the method for recognizing and forewarning the fault of the industrial boiler is applied to an intelligent system for recognizing and forewarning a fault of an industrial boiler, the intelligent system for recognizing and forewarning the fault of the industrial boiler includes a plurality of detection models, the plurality of detection models include the fault diagnosis model and a burner fault detection model, and the method for recognizing and forewarning the fault of the industrial boiler further includes:

acquiring a flame propagation geometry image; and inputting the flame propagation geometry image to the burner fault detection model, and outputting, by the burner fault detection model, a result whether a burner nozzle has a fault.

Optionally, the method for recognizing and forewarning the fault of the industrial boiler is applied to an intelligent system for recognizing and forewarning a fault of an industrial boiler, the intelligent system for recognizing and forewarning the fault of the industrial boiler includes a plurality of detection models, the plurality of detection models include the fault diagnosis model and a drum thermal insulation detection model, and the method for recognizing and forewarning the fault of the industrial boiler further includes:

acquiring a boiler shutdown temperature, an environmental temperature, a boiler type and boiler shutdown time;

inputting the boiler shutdown temperature, the environmental temperature, the boiler type and the boiler shutdown time to the drum thermal insulation detection model, and outputting, by the drum thermal insulation detection model, a predicted drum temperature distribution cloud image, wherein the drum temperature distribution cloud image includes temperatures of all components of the boiler; and acquiring an actual drum temperature distribution cloud image of a boiler drum, and determining a heat radiation abnormity part according to the actual drum temperature distribution cloud image and the predicted drum temperature distribution cloud image.

Optionally, a model training process of the fault diagnosis model includes: acquiring a training image set;

training the fault diagnosis model by taking the training image set as training data to obtain a model training result;

estimating joint distribution of a noise emission label and a true label according to the model training result;

finding out an error sample based on the joint distribution of the noise emission label and the true label, and removing the error sample from the training data; and readjusting a sample category weight of the training data in which the error sample is removed, and retraining the fault diagnosis model until a loss function of the fault diagnosis model is converged.

Optionally, after the step of readjusting a sample category weight of the training data in which the error sample is removed, and retraining the fault diagnosis model until a loss function of the fault diagnosis model is converged, the method further includes:

acquiring newly generated fault data, wherein the newly generated fault data includes a fault and an image corresponding to the fault; and forming new training data by the fault data and the training image set to train the fault diagnosis model so as to obtain a new model training result, and returning the step of estimating the joint distribution of the noise emission label and the true label according to the model training result based on the new model training result.

The present disclosure further provides an intelligent system for recognizing and forewarning a fault of an industrial boiler, including a fault diagnosis module configured to:

acquire preset boiler monitoring parameter combinations, wherein each of the boiler monitoring parameter combinations includes at least one boiler monitoring parameter, and each of the boiler monitoring parameter combinations corresponds to a fault type;

acquire a segmentation time span corresponding to each of the boiler monitoring parameter combinations;

acquire a variation graph of all the boiler monitoring parameters in each of the boiler monitoring parameter combinations, and segment and fragment the variation graph of all the boiler monitoring parameters in a time sequence according to the segmentation time span to obtain fragmented images;

use the fragmented images of all the boiler monitoring parameters within the same time period in each of the boiler monitoring parameter combinations as a fragmented image combination to obtain a plurality of fragmented image combinations; and respectively input the plurality of fragmented image combinations to a preset fault diagnosis model to obtain fault diagnosis results output by the fault diagnosis model and corresponding to all the fragmented image combinations.

According to the present disclosure, the variation of a boiler state is denoted by a curve that the boiler monitoring parameters vary with time, so that the defects including low data acquisition precision, high noise and obvious fluctuation of the industrial boiler may be avoided. By using the fragmented images of all the boiler monitoring parameters within the same time period as the fragmented image combination and using the fragmented image combination as the minimum input unit of the fault diagnosis model, variation features of the different boiler fault monitoring parameters and relatively comprehensive boiler state features may be extracted by the fault diagnosis model, so that fault misjudgment caused by accidental data abnormity or data abnormity resulted from a fault of a data acquisition device is avoided, and the accuracy of fault diagnosis is guaranteed. Therefore, by fault recognition and forewarning based on the image in combination with the fault diagnosis model, a fault which will occur (or has occurred) in the operation process of the industrial boiler is recognized, diagnosed and forewarned, so that the fault may be accurately recognized or predicted in time, and the boiler operation and maintenance personnel may be assisted to rapidly and accurately diagnose potential problems of the boiler.

DETAILED DESCRIPTION OF THE DISCLOSURE

To make the above-mentioned objectives, features and advantages of the present disclosure more obvious and comprehensible, specific embodiments of the present disclosure will be described in detail below with reference to the accompanying drawings.

The present disclosure provides a method for recognizing and forewarning a fault of an industrial boiler.

Figure 1:
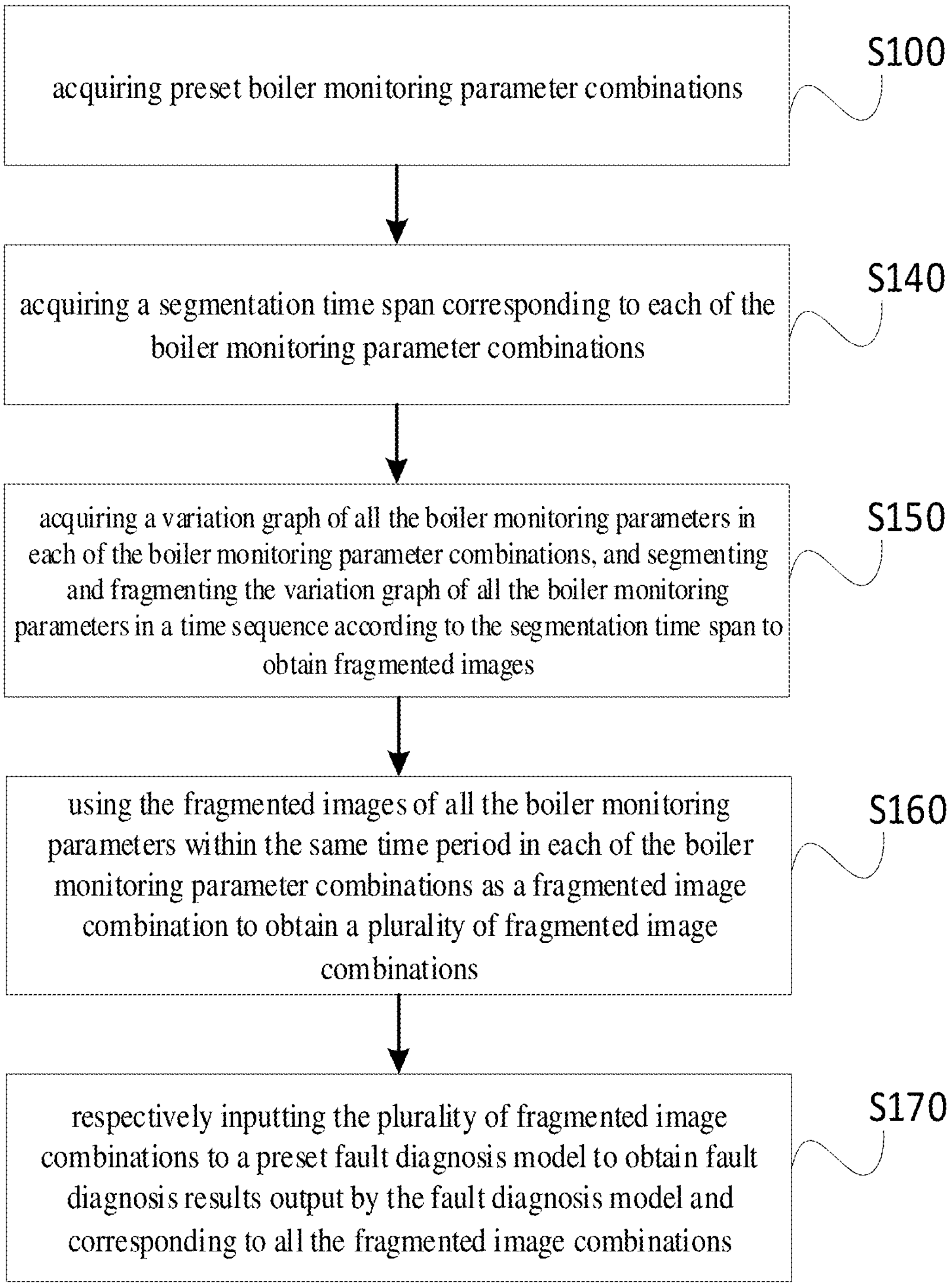
FIG. 1 is a schematic process diagram of an embodiment of a method for recognizing and forewarning a fault of an industrial boiler according to the present disclosure.

In an embodiment, as shown in FIG. 1, the method for recognizing and forewarning the fault of the industrial boiler includes the steps.

Step S100, preset boiler monitoring parameter combinations are acquired, wherein each of the boiler monitoring parameter combinations includes at least one boiler monitoring parameter, and each of the boiler monitoring parameter combinations corresponds to a fault type.

The boiler monitoring parameters include, but are not limited to a steam temperature, a steam pressure, a steam flow, a feedwater flow, a feedwater temperature, a water pump, a boiler water level, a burner motor, a furnace pressure, a furnace temperature, a flue gas temperature, a water tank water level, a cooling water inlet temperature, a cooling water outlet temperature, a primary air fan, a secondary air fan and an induced draft fan, and the boiler monitoring parameters may be acquired by using corresponding sensors. When a certain fault occurs, one or more of the boiler monitoring parameters will be abnormal. For example, when a boiler low pressure fault occurs, the phenomena of too low steam temperature, too low steam pressure and too low water outlet temperature may occur; and when a fault that water drops from a chimney occurs, the phenomenon that the temperature of the chimney is too low may occur. In view of this, whether a fault occurs may be judged by one or more boiler monitoring parameters.

The boiler monitoring parameter combinations are preset, and each of the boiler monitoring parameter combinations corresponds to a fault type. For example, the too low steam temperature, the too low steam pressure and the too low water outlet temperature correspond to the boiler low pressure fault; the too low steam temperature, a too low steam flow and a too high feedwater flow correspond to a boiler water overrun fault; and the too low steam pressure, the too low steam flow, a too low furnace pressure and a too low furnace temperature correspond to an air preheater damage fault. Different boiler monitoring parameter combinations may correspond to the same fault, for example, both of a first combination of the too high steam pressure and the too low steam flow and a second combination of the too high steam temperature and the too high steam pressure correspond to a boiler overpressure fault. Optionally, the fault type corresponding to each of the boiler monitoring parameter combinations is further preset while the boiler monitoring parameter combinations are preset. A corresponding relationship between each of the boiler monitoring parameter combinations and the fault type may be stored in a form of a mapping table.

Step S140, a segmentation time span corresponding to each of the boiler monitoring parameter combinations is acquired.

The segmentation time span refers to a segmentation time span for segmentation and fragmentation, namely a time span of each of fragmented images. For example, the time span of a fragmented image may be 10 min, 15 min and 20 min.

The segmentation time spans corresponding to different boiler monitoring parameter combinations may be the same or different.

In an implementation, the segmentation time spans corresponding to the combinations are determined according to the frequency of acquiring the boiler monitoring parameters in the boiler monitoring parameter combinations. Optionally, before the step S140, the method further includes:

step S110, data acquisition time intervals of all the boiler monitoring parameters in each of the boiler monitoring parameter combinations are acquired, and a first boiler monitoring parameter with the maximum data acquisition time interval in each of the boiler monitoring parameter combinations is determined.

The data acquisition time intervals of the different boiler monitoring parameters may be different. In order to ensure that the data volume included in each fragmented image is greater than or equal to the minimum data volume, the boiler monitoring parameter with the maximum data acquisition time interval in each of the boiler monitoring parameter combinations, namely the boiler monitoring parameter which is acquired at the lowest speed, is used for subsequently determining the segmentation time span. For fabricating description, the boiler monitoring parameter with the maximum data acquisition time interval is known as the first boiler monitoring parameter.

In order to ensure the accuracy of training and predicting the fault diagnosis model, it is required to ensure that the data volume of each boiler monitoring parameter meets the demand on the minimum data volume, and therefore, the segmentation time span corresponding to each of the boiler monitoring parameter combinations is determined by the boiler monitoring parameter with the maximum data acquisition time interval. For example, if the minimum data volume is 30 data points, a certain boiler monitoring parameter combination includes a steam temperature and a steam pressure, the steam temperature is acquired at a frequency that a piece of data is uploaded every 45 s, and the steam pressure is acquired at a frequency that a piece of data is uploaded every 30 s, it needs 1350 s to acquire the 30 continuous data points of the steam temperature, it needs 900 s to acquire the 30 continuous data points of the steam pressure, the data acquisition time interval of the steam temperature is longer than that of the steam pressure, the time spent for acquiring a sufficient data volume for the steam temperature is longer than that of the steam pressure, and therefore, the segmentation time span corresponding to the boiler monitoring parameter combination is determined based on the steam temperature.

Step S120, the number of preset data acquisition points of the first boiler monitoring parameter in each of the boiler monitoring parameter combinations is determined.

The number of preset data acquisition points is the above-mentioned minimum data volume. The first boiler monitoring parameters of different boiler monitoring parameter combinations may be the same or different, and the different boiler monitoring parameter combinations with the same first boiler monitoring parameter may be different in the number of the preset data acquisition points. For example, the first boiler monitoring parameters of a first combination of the too low steam pressure, the too low furnace pressure and the too low furnace temperature and a second combination of the too low steam flow and the too low furnace temperature are both the furnace temperature, the number of the preset data acquisition points of the first boiler monitoring parameter in the first combination may be 30, and the number of the preset data acquisition points of the first boiler monitoring parameter in the first combination may be 25.

Step S130, the segmentation time span corresponding to each of the boiler monitoring parameter combinations is determined according to the data acquisition time interval of the first boiler monitoring parameter in each of the boiler monitoring parameter combinations and the number of the preset data acquisition points.

The segmentation time span determined based on the data acquisition time interval of the first boiler monitoring parameter and the number of the preset data acquisition points may ensure that the data volume of the first boiler monitoring parameter is greater than or equal to the number of the preset data acquisition points within the time span.

In an implementation, a product of the data acquisition time interval of the first boiler monitoring parameter and the number of the preset data acquisition points may be used as the segmentation time span corresponding to each of the boiler monitoring parameter combinations. For example, if the data acquisition time interval of the first boiler monitoring parameter in a certain boiler monitoring parameter combination is 45 s, and the number of the preset data acquisition points is 30, the segmentation time span corresponding to the boiler monitoring parameter combination is 1350 s.

The segmentation time span corresponding to the boiler monitoring parameter combination is determined according to the data acquisition time interval of the first boiler monitoring parameter with the maximum data acquisition time interval in the boiler monitoring parameter combination and the number of the preset data acquisition points, so that it is ensured that the fragmented images of each boiler monitoring parameter in the boiler monitoring parameter combination include the sufficient data volume, and the effectiveness and accuracy of training the fault diagnosis model and the accuracy of a prediction result of the fault diagnosis model are guaranteed.

Step S150, a variation graph of all the boiler monitoring parameters in each of the boiler monitoring parameter combinations is acquired, and the variation graph of all the boiler monitoring parameters are segmented and fragmented in a time sequence according to the segmentation time span to obtain fragmented images.

The variation graph of all the boiler monitoring parameters refers to a curve graph that all the boiler monitoring parameters vary with time. In the curve graph that all the boiler monitoring parameters vary with time, time is used as horizontal coordinates, and the boiler monitoring parameters are used as longitudinal coordinates, as shown in FIG. 2 which is a diagram showing that the steam pressure varies with time.

Acquisition devices which are mainly various sensors such as a temperature sensor, a pressure sensor and a water level sensor applied to all the boiler monitoring parameters may be disposed. After acquiring data, the acquisition devices transmit the data to a processor, and the processor generates the graph that the parameters vary with time. All the boiler monitoring parameters may also be uploaded artificially.

Figure 2:
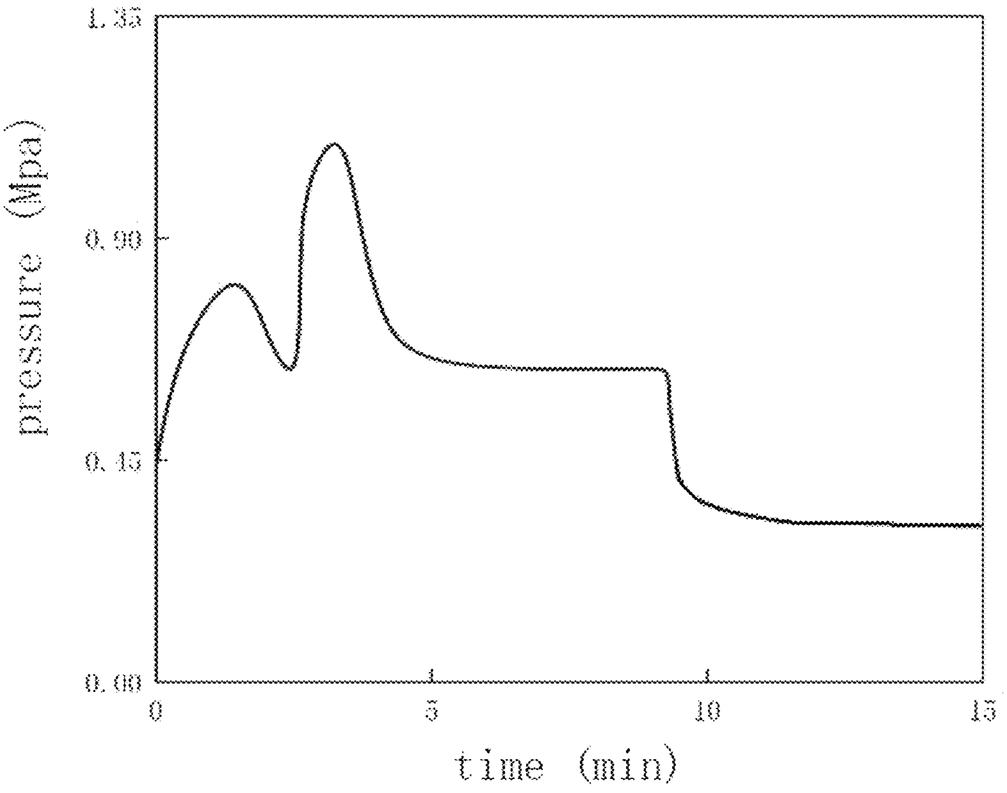
FIG. 2 is an example diagram of fragmented images in the method for recognizing and forewarning the fault of the industrial boiler according to the present disclosure.
Figure 3:
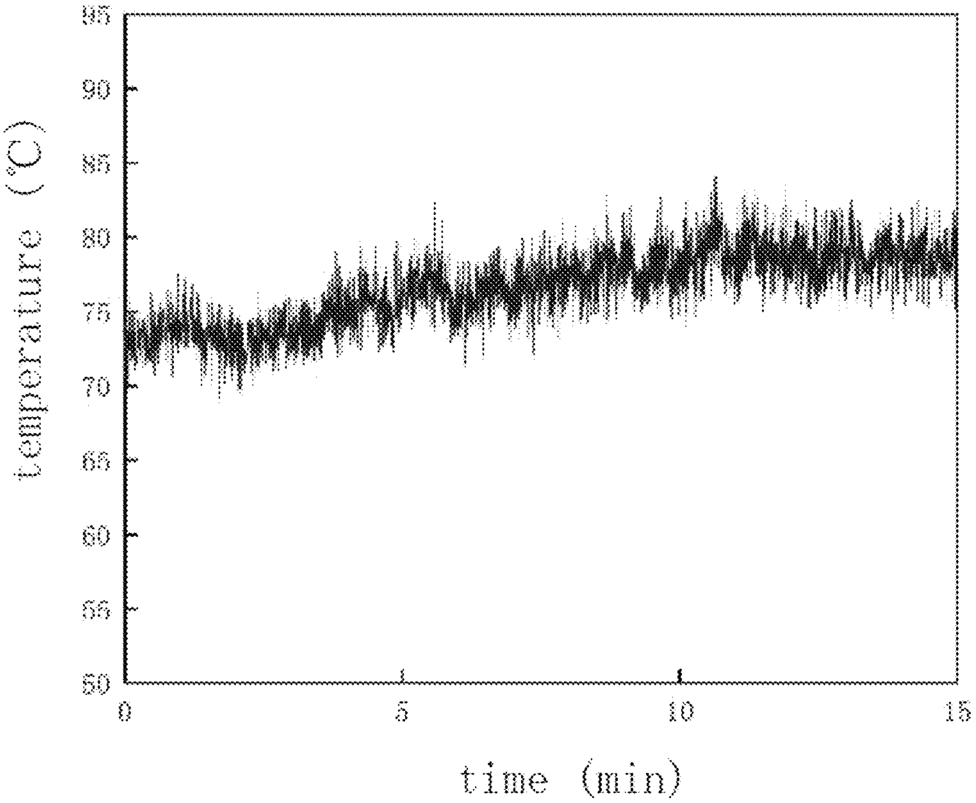
FIG. 3 is another example diagram of the fragmented images in the method for recognizing and forewarning the fault of the industrial boiler according to the present disclosure.

The variation graph of all the boiler monitoring parameters are segmented and fragmented in a time sequence according to the segmentation time span, as shown in FIG. 2 and FIG. 3 which are respectively a fragmented image of the steam pressure and a fragmented image of the steam temperature, and the segmentation time spans of the two fragmented images are both 15 min.

Optionally, the step that the variation graph of all the boiler monitoring parameters are segmented and fragmented in a time sequence according to the segmentation time span to obtain fragmented images includes: a sliding window is used to slide at a preset step length on the variation graph of all the boiler monitoring parameters in a time sequence, and a region selected by sliding the sliding window on the variation graph of all the boiler monitoring parameters every time is segmented into a fragmented image, wherein the width of the sliding window is equal to the segmentation time span.

The sliding window slides at a preset step length on the variation graph of all the boiler monitoring parameters in the time sequence. For example, in a graph that a certain boiler monitoring parameter varies with time, if the segmentation time span is min, the time span of every two fragmented images is constant to be 5 min, and the preset step length is 1 min, a first fragmented image is within the time period ranging from 5:00 to 5:05, a second fragmented image is within the time period ranging from to 5:06, and a third fragmented image is within the time period ranging from 5:02 to 5:07.

In an implementation, the preset step length may be determined according to the data acquisition time interval of the first boiler monitoring parameter. Specifically, the preset step length may be greater than or equal to the data acquisition time interval of the first boiler monitoring parameter, and therefore, it may be ensured that the sliding window may be brought into at least one new data point when sliding every time.

In another implementation, the preset step length may be a preset constant value such as a value ranging from 30 s to 90 s.

Step S160, the fragmented images of all the boiler monitoring parameters within the same time period in each of the boiler monitoring parameter combinations are used as a fragmented image combination to obtain a plurality of fragmented image combinations.

For example, if a certain boiler monitoring parameter combination includes a steam flow and a furnace temperature, and the time periods ranging from 5:00 to 5:05, 5:01 to 5:06 and 5:02 to 5:07 are time periods of three fragmented images, a fragmented image of the steam flow and a fragmented image of the furnace temperature within the time period ranging from 5:00 to 5:05 are used as a fragmented image combination, a fragmented image of the steam flow and a fragmented image of the furnace temperature within the time period ranging from 5:01 to 5:06 are used as a fragmented image combination, and a fragmented image of the steam flow and a fragmented image of the furnace temperature within the time period ranging from 5:02 to 5:07 are used as a fragmented image combination.

Step S170, the plurality of fragmented image combinations are respectively input to a preset fault diagnosis model to obtain fault diagnosis results output by the fault diagnosis model and corresponding to all the fragmented image combinations.

A fragmented image combination is input to a preset fault diagnosis model, and thus, a fault diagnosis result corresponding to the fragmented image combination may be obtained. In an implementation, when the fault diagnosis result corresponding to any one of the fragmented image combinations has a fault, a fault occurrence prompt is output.

In another implementation, a plurality of fragmented image combinations which are continuous in time are respectively input to a fault diagnosis model, the fault diagnosis model outputs fault diagnosis results corresponding to all the fragmented image combinations, and a final fault diagnosis result is output based on the fault diagnosis results corresponding to the plurality of fragmented image combinations. Specifically, it may be determined whether a fault occurs based on the occurrence number of the fault in the plurality of fragmented image combinations; when the occurrence number of the fault is smaller than a preset number, it is determined that the fault does not occur; and when the occurrence number of the fault is greater than or equal to the preset number, it is determined that the fault occurs, and the fault occurrence prompt is output. For example, the time periods ranging from 5:00 to 5:05, 5:01 to 5:06, 5:02 to 5:07, 5:03 to 5:08 and 5:04 to 5:09 are time periods, which are continuous in time, of five fragmented image combinations, and after the five fragmented image combinations are respectively input to the fault diagnosis model, fault diagnosis results which are respectively normal, boiler low pressure, normal, normal and normal corresponding to the five fragmented image combinations are obtained, that is, the boiler low pressure fault only occurs once by accident, and therefore, the final fault diagnosis result may be normal.

The fault diagnosis model includes a feature extraction layer for extracting feature values of the fragmented images, and the feature values include at least one of the following items: a slope, a curvature, peak and trough values, a variance and superthreshold maintenance time of a curve that the boiler monitoring parameters vary with time in the fragmented images.

The superthreshold maintenance time refers to the duration when a boiler monitoring parameter exceeds an upper limit threshold or lower than a lower limit threshold. For example, if a threshold of a flue gas temperature is 100° C., and the duration in a 10 min fragmented image is 5 min, it is determined that the flue gas temperature is too high.

The fault diagnosis model may be a convolutional neural network (CNN) model.

Training source data of the fault diagnosis model may be extracted from historical operation data and corresponding fault data. The graph that all the boiler monitoring parameters vary with time may be acquired based on the historical operation data, the steps as shown in the step S100 to the step S160 are performed to obtain a fragmented image combination, a fault result of the time period within which the fragmented image combination is is determined, and the fragmented image combination and the fault result of the time period within which the fragmented image combination is are respectively used as a piece of training data and a label corresponding to the training data so as to be used as training samples of the fault diagnosis model.

Optionally, the fault diagnosis model further includes an activation layer, a pooling layer and a full connection layer. The activation layer may adopt at least one of the following functions: a Relu activation function, a Leaky Relu activation function, a LogSigmod activation function, a Maxout activation function, a tan h activation function and an ELU activation function. The pooling layer may adopt maximum pooling or average pooling to further reduce the data volume. A full connection network may be applied to the full connection layer according to the feature values obtained through the above-mentioned feature extraction layer, activation layer and pooling layer by means of a Softmax classification function, it is determined whether a fault occurs and which type of fault occurs according to a statistic probability value, and the fault type includes at least one of the following faults: boiler overpressure, boiler water shortage, priming, overheater fracture, boiler water hammer, boiler water overrun, water-cooled wall tube cracking, fan fault, water pump fault, drum thermal insulation fault, sensor fault, water softening system fault, ignition fault and flameout fault.

The preset boiler monitoring parameter combinations are acquired; the segmentation time span corresponding to each of the boiler monitoring parameter combinations is determined; the variation graph of all the boiler monitoring parameters in each of the boiler monitoring parameter combinations is segmented and fragmented in the time sequence based on the segmentation time span to obtain the fragmented images; the fragmented images of all the boiler monitoring parameters within the same time period in each of the boiler monitoring parameter combinations are used as the fragmented image combination to obtain the plurality of fragmented image combinations; and the plurality of fragmented image combinations are respectively input to the preset fault diagnosis model to obtain the fault diagnosis results output by the fault diagnosis model and corresponding to all the fragmented image combinations. The variation of a boiler state is denoted by a curve that the boiler monitoring parameters vary with time, so that the defects including low data acquisition precision, high noise and obvious fluctuation of the industrial boiler may be avoided. By using the fragmented images of all the boiler monitoring parameters within the same time period as the fragmented image combination and using the fragmented image combination as the minimum input unit of the fault diagnosis model, variation features of the different boiler fault monitoring parameters and relatively comprehensive boiler state features may be extracted by the fault diagnosis model, so that fault misjudgment caused by accidental data abnormity or data abnormity resulted from a fault of a data acquisition device is avoided, and the accuracy of fault diagnosis is guaranteed. Therefore, by fault recognition and forewarning based on the image in combination with the fault diagnosis model, a fault which will occur (or has occurred) in the operation process of the industrial boiler is recognized, diagnosed and forewarned, so that the fault may be accurately recognized or predicted in time, and the boiler operation and maintenance personnel may be assisted to rapidly and accurately diagnose potential problems of the boiler.

In another embodiment of the method for recognizing and forewarning the fault of the industrial boiler according to the present disclosure, the method for recognizing and forewarning the fault of the industrial boiler is applied to an intelligent system for recognizing and forewarning a fault of an industrial boiler, the intelligent system for recognizing and forewarning the fault of the industrial boiler includes a plurality of detection models, the plurality of detection models include the fault diagnosis model and a slagging/scaling evaluation model, and the method for recognizing and forewarning the fault of the industrial boiler further includes the steps.

Step S200, a mineral composition of a fuel used for the boiler is acquired.

XRF detection (XRF refers to X-ray fluorescent spectroscopic analysis) may be performed on the fuel such as coal and biomass commonly used for the boiler to measure the mineral composition of the fuel, and the mineral composition of the fuel commonly used for the boiler is stored to be acquired at any time.

Step S210, an image acquired from each heat exchange surface pipeline of the boiler every other preset time is acquired.

For each heat exchange surface (such as a reheater, an economizer and a condenser) pipeline of the boiler, the image of the pipeline is acquired every other preset time, and thus, images of each heat exchange surface pipeline within different time may be acquired. The preset time may be selected to be 1 to 3 days. The images of each heat exchange surface pipeline within the different time may be actual images of the heat exchange surface pipeline or experimental data images (such as ash slag images) of the fuel on each heat exchange surface pipeline in a laboratory.

Step S220, an edge of the image acquired from each heat exchange surface pipeline every other preset time is detected to obtain a binary image of an ash deposition form, and the geometric form of ash deposition is acquired based on the binary image of the ash deposition form.

Figure 4:
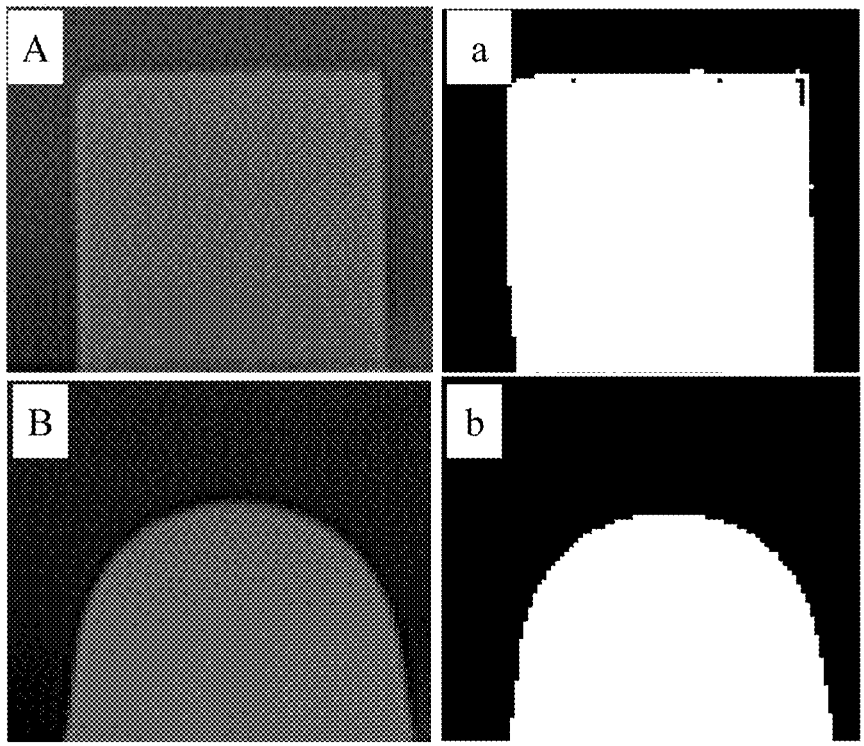
FIG. 4 is a comparative example diagram of an original image of an ash deposition form and a binary image in the method for recognizing and forewarning the fault of the industrial boiler according to the present disclosure.

The image of the heat exchange surface pipeline may show the ash deposition form, and the ash deposition form may be acquired by processing the image of the heat exchange surface pipeline. For the image acquired from each heat exchange surface pipeline every other preset time, the edge of each image is detected, and thus, the binary image of the ash deposition form may be obtained. As shown in FIGS. 4, A and B are original images of the heat exchange surface pipeline within different time, a and b are respectively binary images of A and B. The geometric form, such as an ash deposition height, an ash deposition width, an ash deposition area and an ash deposition length-to-width ratio, of ash deposition may be acquired based on the binary image of the ash deposition form. The variation of the ash deposition form may be known by comparison between a and b.

Step S230, the slagging/scaling evaluation model is trained by taking the mineral composition of the fuel, the operation time of the boiler and the corresponding geometric form of the ash deposition as training data until a loss function of the slagging/scaling evaluation model is converged, and the slagging/scaling evaluation model with the loss function being converged may be used for subsequent slagging/scaling evaluation.

The slagging/scaling evaluation model is trained by taking the mineral composition of the fuel and the operation time of the boiler as input parameters and taking the corresponding geometric form of ash deposition as an output parameter, wherein the slagging/scaling evaluation model is a back propagation neural network (BP network). The slagging/scaling evaluation model may be a convolutional neural network (CNN) model.

After the slagging/scaling evaluation model is trained, for an unknown fuel, a mineral composition of the unknown fuel may be acquired and input to the above-mentioned slagging/scaling evaluation model, and a slagging/scaling variation rule curve may be predicted, and then, working personnel is assisted to make a corresponding ash removal plan, so that ash slags and ash scales may be removed in time.

In an embodiment, after the step S230, the method further includes the steps. Step S240, a mineral composition of a to-be-recognized fuel and operation time of the boiler are acquired.

Step S250, the mineral composition of the to-be-recognized fuel and the operation time of the boiler are input to the slagging/scaling evaluation model (namely the trained slagging/scaling evaluation model), and the slagging/scaling evaluation model outputs a geometric form of ash deposition of the to-be-recognized fuel, wherein the geometric form of the ash deposition includes at least one of a height, a width, an area and a length-to-width ratio.

The to-be-recognized fuel described herein refers to a fuel with the geometric form of ash deposition or variation rule needing to be determined. The mineral composition of the to-be-recognized fuel and the operation time of the boiler are acquired and used as input parameters of the trained slagging/scaling evaluation model, and thus, the geometric form of ash deposition of the to-be-recognized fuel output by the slagging/scaling evaluation model is acquired.

The ash deposition form of the to-be-recognized fuel at the current moment may be determined based on the geometric form of ash deposition of the to-be-recognized fuel output by the slagging/scaling evaluation model. In view of this, the appropriate ash removal time may be determined.

Optionally, the plurality of detection models further include a pipeline creepage detection model, and the method for recognizing and forewarning the fault of the industrial boiler further includes the steps.

Step S300, a heat exchange pipeline image is acquired.

Step S310, the heat exchange pipeline image is input to the pipeline creepage detection model, and the pipeline creepage detection model outputs a probability that creep rupture occurs to a pipeline corresponding to the heat exchange pipeline image. A boiler pipeline is slagged and scaled to cause heat exchange non-uniformity of the pipeline and deformation of a material, this process is known as pipeline creepage. Creepage often occurs in a boiler heat exchange system, generally, it occurs with the variation of a geometric form such as pipeline sinking and swelling, and it may even cause creep rupture, and therefore, analysis on the probability that creep rupture occurs to the pipeline may scientifically direct a user of the boiler whether the pipeline needs to be replaced or the water quality needs to be improved and direct the user to replace the fuel or improve a boiler operation manner, thereby being significant to the normal use of the boiler.

The pipeline creepage detection model may be a convolutional neural network (CNN) model.

The heat exchange pipeline image described herein may be only an image of a pipeline part where creepage easily occurs.

In further embodiment of the method for recognizing and forewarning the fault of the industrial boiler according to the present disclosure, the method for recognizing and forewarning the fault of the industrial boiler is applied to an intelligent system for recognizing and forewarning a fault of an industrial boiler, the intelligent system for recognizing and forewarning the fault of the industrial boiler includes a plurality of detection models, the plurality of detection models include the fault diagnosis model and a burner fault detection model, and the method for recognizing and forewarning the fault of the industrial boiler further includes the steps.

Step S400, a flame propagation geometry image is acquired.

Step S410, the flame propagation geometry image is input to the burner fault detection model, and the burner fault detection model outputs a result whether a burner nozzle has a fault.

Figure 5:
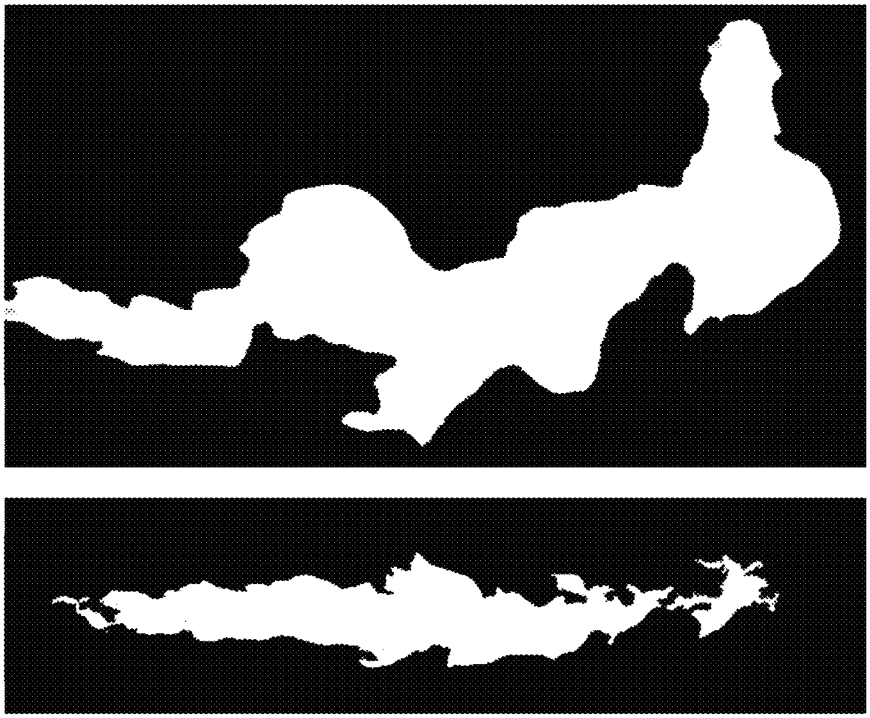
FIG. 5 is a comparative example diagram of different geometrical forms of flame propagation in the method for recognizing and forewarning the fault of the industrial boiler according to the present disclosure.

A burner fault is one of common faults, such as ignition failure, combustion instability, sudden flameout and low thermal efficiency, of the industrial boiler. It is very different to position a specific fault due to the relatively complicated structure of the burner, which causes difficulty in maintenance. It is proposed in the present disclosure that the working condition of the burner nozzle is judged by detecting a geometric form of flame propagation by using an artificial intelligent image recognition technology. As shown in FIG. 5, different nozzles, different gas flow rates and flame propagation forms thereof are very different, reversely, it may be further determined whether the nozzle has a fault according to the geometric form of flame propagation. For a given-type nozzle and working condition, a convolutional neural network (CNN) model (wherein the burner fault detection model is the CNN model) is trained by taking the flame propagation geometry image (as shown in FIG. 5) as an input parameter and a fault result (whether a fault occurs; or a normal/abnormal situation occurs) corresponding to the flame propagation geometry image as an output parameter to obtain the burner fault detection model. In a training process of the burner fault detection model, feature optimization is performed by using a gradient descent method (convolution kernel optimization).

In yet further embodiment of the method for recognizing and forewarning the fault of the industrial boiler according to the present disclosure, the method for recognizing and forewarning the fault of the industrial boiler is applied to an intelligent system for recognizing and forewarning a fault of an industrial boiler, the intelligent system for recognizing and forewarning the fault of the industrial boiler includes a plurality of detection models, the plurality of detection models include the fault diagnosis model and a drum thermal insulation detection model, and the method for recognizing and forewarning the fault of the industrial boiler further includes the steps.

Step S500, a boiler shutdown temperature, an environmental temperature, a boiler type and boiler shutdown time are acquired.

Step S510, the boiler shutdown temperature, the environmental temperature, the boiler type and the boiler shutdown time are input to the drum thermal insulation detection model, and the drum thermal insulation detection model outputs a predicted drum temperature distribution cloud image, wherein the drum temperature distribution cloud image includes temperatures of all components of the boiler.

Step S520, an actual drum temperature distribution cloud image of a boiler drum is acquired, and a heat radiation abnormity part is determined according to the actual drum temperature distribution cloud image and the predicted drum temperature distribution cloud image.

The boiler shutdown temperature refers to a temperature during boiler shutdown, and the boiler shutdown time refers to the time after the boiler is shut down, such as 10 min after the boiler is shut down and 20 min after the boiler is shut down. The boiler shutdown temperature, the environmental temperature, the boiler type and the boiler shutdown time are input to the drum thermal insulation detection model, and the drum thermal insulation detection model may output a drum temperature distribution cloud image under the condition that the thermal insulation capacity of a drum is normal. During subsequent conventional boiler detection, the heat radiation abnormity part, namely a thermal insulation failure part, may be rapidly positioned to be overhauled by comparing the actual drum temperature distribution cloud image with the predicted drum temperature distribution cloud image.

The drum thermal insulation detection model may be a convolutional neural network (CNN) model.

For the actual drum temperature distribution cloud image, a detected boiler may be burned to a certain temperature and is then shut down, a boiler body is subjected to temperature measurement and imaged by using an infrared thermal imager, and the temperature is measured once every other preset time interval (such as 30-60 min), so that a graph of a rule that the temperatures of all the components of the boiler vary with time, namely the actual drum temperature distribution cloud image of all the components of the boiler on different time points, is obtained.

The drum thermal insulation detection model acquires temperature variation data of a boiler with normal thermal insulation capacity (such as a boiler just leaving from a factory) under different boiler shutdown temperatures and different environmental temperatures as training data.

The compositions of the boiler include a flue gas pipeline, a front smoke box, a rear smoke box and the like.

In further another embodiment of the method for recognizing and forewarning the fault of the industrial boiler according to the present disclosure, the method for recognizing and forewarning the fault of the industrial boiler is applied to an intelligent system for recognizing and forewarning a fault of an industrial boiler, the intelligent system for recognizing and forewarning the fault of the industrial boiler includes a plurality of detection models, and the plurality of detection models include a fault diagnosis model, a slagging/scaling evaluation model, a pipeline creepage detection model, a burner fault detection model and a drum thermal insulation detection model, wherein all the models of the detection models are described in detail as above, and the detailed descriptions thereof are omitted herein.

Results of the fault diagnosis model and the pipeline creepage detection model may be subjected to cross validation. Specifically, when the fault diagnosis model predicts boiler water shortage, the pipeline creepage detection model evaluates that a certain pipeline may be ruptured at a certain moment in the future to cause the leakage of water serving as a working medium, the fault diagnosis model may verify the correctness of such a diagnosis of creep rupture diagnosed by the pipeline creepage detection model, and at the moment, the fault prompt level may be improved.

Results of the fault diagnosis model and the burner fault detection model may be subjected to cross validation. Specifically, when the fault diagnosis model predicts a boiler fault, the burner fault detection model also detects the boiler fault, mutual validation therebetween is performed, and thus, the fault prompt level may be improved.

In an embodiment, in order to improve the safety and increase the overhaul efficiency, when an output result of any one of the above-mentioned detection models shows that a fault occurs, a fault prompt is output to remind working personnel of performing overhaul in time.

For the training of any one of the above-mentioned detection models, firstly, historical operation data of the boiler and a fault corresponding to the historical operation data are used as a training set to train a detection model which may be put into actual use, in a use process, real-time operation data and a corresponding fault may be collected as a new training set to verify, optimize and retrain the existing model, and thus, the diagnosis accuracy of each of the models is further improved.

In yet further another embodiment of the method for recognizing and forewarning the fault of the industrial boiler according to the present disclosure, a model training process for the plurality of detection models includes the steps.

Step S600, a training image set is acquired. The training image set of the fault diagnosis model is the above-mentioned graph that the boiler monitoring parameters vary with time and is specifically the fragmented image combinations. The training image set of the slagging/scaling evaluation model may be laboratory experimental result images or on-site slagging/scaling images. The training image set of the pipeline creepage detection model is images acquired during on-site maintenance or artificially acquired on-site images or images automatically acquired by a data acquisition device. The training image set of the burner fault detection model is actual burner flame shot images and simulated images, wherein the simulated images include burner flame propagation simulation images and thermal simulation images for heat transfer between a boiler body and an external environment (boiler room). Optionally, before the training image set is acquired, image preprocessing is preformed on the training image set, and the preprocessing includes: denoising, enhancement, filling and ablation.

Step S610, the detection model is trained by taking the training image set as training data to obtain a model training result, wherein different detection models adopt different training image sets. An input image corresponding to a given fault is subjected to feature extraction, wherein the feature may be a randomly initialized feature or an initial feature which is given artificially (such as by means of experience of an expert or the mechanism of a process itself), and the accuracy is improved by continuous learning achieved by using a gradient descent method.

Step S620, joint distribution of a noise emission label and a true label is estimated according to the model training result.

The joint distribution of the noise emission label and the true label may be obtained by cross verification, calculation of a count matrix, labeling of the count matrix and estimation of the joint distribution of the noise emission label and the true label, the relevant steps are described in the prior art, the descriptions thereof are omitted herein.

Step S630, an error sample is found out based on the joint distribution of the noise emission label and the true label, and the error sample is removed from the training data.

The error sample may be filtered by using $C_{Confusion}$ non-diagonal processing, non-diagonal processing, prune by class (PBC), prune by noise rate (PBNR) or a method that PBC and PBNR are simultaneously adopted. A relevant method is the prior art, the descriptions thereof are omitted herein.

Step S640, a sample category weight of the training data in which the error sample is removed is readjusted, and the fault diagnosis model is retrained until a loss function of the diagnosis model is converged.

Herein, the detection model may be retained by using a co-teaching method.

The quality of the training data greatly affects the precision of the model. Therefore, in the present disclosure, error labels (noised labels) are labeled and removed by integrating a confident-learning method to achieve the purpose of improving the model diagnosis precision.

After the step S640, the method further includes the steps:

step S650, newly generated fault data is acquired, wherein the newly generated fault data includes a fault and an image corresponding to the fault; and step S660, new training data is formed by the fault data and the training image set to train the fault diagnosis model so as to obtain a new model training result, and the steps S620 to S640 are returned to be performed based on the new model training result.

Figure 6:
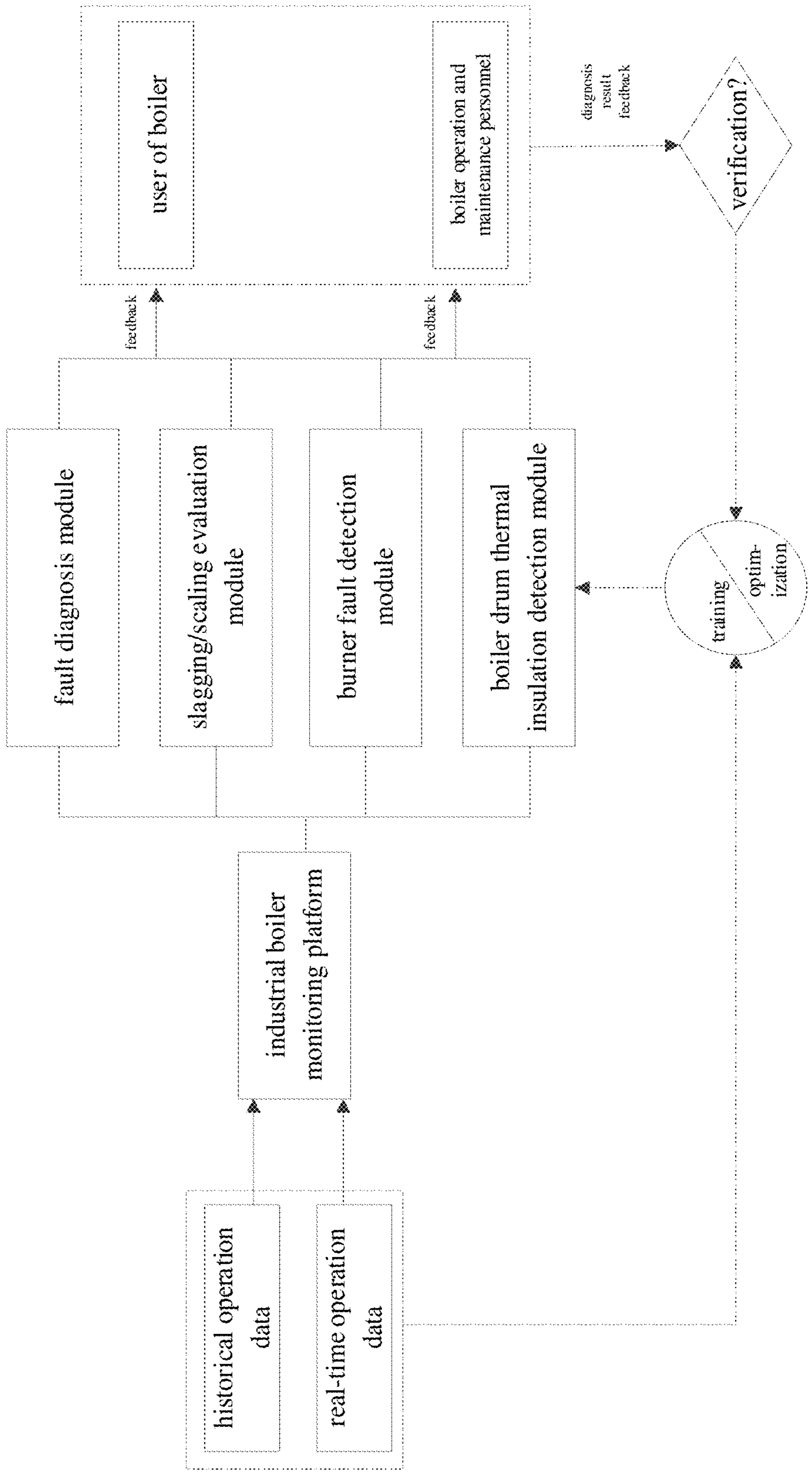
FIG. 6 is a schematic architecture diagram of an intelligent system for recognizing and forewarning a fault of an industrial boiler according to the present disclosure.

As shown in FIG. 6, the new fault data is generated after a model is trained based on the steps S610 to S640, the new fault data may be used as a new training set to retrain the existing model, so that the existing model is verified and optimized to further improve the accuracy of the model. The initial training image set is the historical data of the industrial boiler, and the new real-time operation data generated by subsequently using the boiler and the historical data combined with the corresponding fault are used as the training data for retraining the existing model.

Specifically, in the present embodiment, the model training process of the fault diagnosis model includes the steps:

a training image set is acquired;

the fault diagnosis model is trained by taking the training image set as training data to obtain a model training result;

joint distribution of a noise emission label and a true label is estimated according to the model training result;

an error sample is found out based on the joint distribution of the noise emission label and the true label, and the error sample is removed from the training data; and a sample category weight of the training data in which the error sample is removed is readjusted, and the fault diagnosis model is retrained until a loss function of the fault diagnosis model is converged.

After the step that in the model training process of the fault diagnosis model, the sample category weight of the training data in which the error sample is removed is readjusted, and the fault diagnosis model is retrained until the loss function of the fault diagnosis model is converged, the method further includes the steps:

newly generated fault data is acquired, wherein the newly generated fault data includes a fault and an image corresponding to the fault; and new training data is formed by the fault data and the training image set to train the fault diagnosis model so as to obtain a new model training result, and the step that the joint distribution of the noise emission label and the true label is estimated according to the model training result is returned to be performed based on the new model training result.

The present disclosure further provides an intelligent system for recognizing and forewarning a fault of an industrial boiler. In an implementation, the intelligent system includes:

a fault diagnosis module configured to: acquire preset boiler monitoring parameter combinations, wherein each of the boiler monitoring parameter combinations includes at least one boiler monitoring parameter, and each of the boiler monitoring parameter combinations corresponds to a fault type; acquire a segmentation time span corresponding to each of the boiler monitoring parameter combinations; acquire a variation graph of all the boiler monitoring parameters in each of the boiler monitoring parameter combinations, and segment and fragment the variation graph of all the boiler monitoring parameters in a time sequence according to the segmentation time span to obtain fragmented images; use the fragmented images of all the boiler monitoring parameters within the same time period in each of the boiler monitoring parameter combinations as a fragmented image combination to obtain a plurality of fragmented image combinations; and respectively input the plurality of fragmented image combinations to a preset fault diagnosis model to obtain fault diagnosis results output by the fault diagnosis model and corresponding to all the fragmented image combinations. Relevant explanations are described as above, the descriptions thereof are omitted herein.

Optionally, the fault diagnosis module is further configured to: use a sliding window to slide at a preset step length on the variation graph of all the boiler monitoring parameters in a time sequence, and segment a region selected by sliding the sliding window on the variation graph of all the boiler monitoring parameters every time into a fragmented image, wherein the width of the sliding window is equal to the segmentation time span.

Optionally, the fault diagnosis module is further configured to: acquire data acquisition time intervals of all the boiler monitoring parameters in each of the boiler monitoring parameter combinations, and determine a first boiler monitoring parameter with the maximum data acquisition time interval in each of the boiler monitoring parameter combinations; determine the number of preset data acquisition points of the first boiler monitoring parameter in each of the boiler monitoring parameter combinations; and determine the segmentation time span corresponding to each of the boiler monitoring parameter combinations according to the data acquisition time interval of the first boiler monitoring parameter in each of the boiler monitoring parameter combinations and the number of the preset data acquisition points.

Optionally, the intelligent system for recognizing and forewarning the fault of the industrial boiler further includes a slagging/scaling evaluation module configured to:

acquire a mineral composition of a to-be-recognized fuel and operation time of the boiler; and input the mineral composition of the to-be-recognized fuel and the operation time of the boiler to the slagging/scaling evaluation model, and output, by the slagging/scaling evaluation model, a geometric form of ash deposition of the to-be-recognized fuel, wherein the geometric form of the ash deposition includes at least one of a height, a width, an area and a length-to-width ratio. Relevant explanations are described as above, the descriptions thereof are omitted herein.

Optionally, the slagging/scaling evaluation module is further configured to: acquire a mineral composition of a fuel used for the boiler; acquire an image acquired from each heat exchange surface pipeline of the boiler every other preset time; detect an edge of the image acquired from each heat exchange surface pipeline every other preset time to obtain a binary image of an ash deposition form, and acquire the geometric form of ash deposition based on the binary image of the ash deposition form; and train the slagging/scaling evaluation model by taking the mineral composition of the fuel, the operation time of the boiler and the corresponding geometric form of the ash deposition as training data until a loss function of the slagging/scaling evaluation model is converged.

Optionally, the intelligent system for recognizing and forewarning the fault of the industrial boiler further includes a burner fault detection module configured to: acquire a flame propagation geometry image; and input the flame propagation geometry image to the burner fault detection model, and output, by the burner fault detection model, a result whether a burner nozzle has a fault. Relevant explanations are described as above, the descriptions thereof are omitted herein.

Optionally, the intelligent system for recognizing and forewarning the fault of the industrial boiler further includes a boiler drum thermal insulation detection module configured to: acquire a boiler shutdown temperature, an environmental temperature, a boiler type and boiler shutdown time; input the boiler shutdown temperature, the environmental temperature, the boiler type and the boiler shutdown time to the drum thermal insulation detection model, and output, by the drum thermal insulation detection model, a predicted drum temperature distribution cloud image, wherein the drum temperature distribution cloud image includes temperatures of all components of the boiler; and acquire an actual drum temperature distribution cloud image of a boiler drum, and determine a heat radiation abnormity part according to the actual drum temperature distribution cloud image and the predicted drum temperature distribution cloud image. Relevant explanations are described as above, the descriptions thereof are omitted herein.

As shown in FIG. 6, the present disclosure provides an intelligent system for recognizing and forewarning a fault of an industrial boiler based on an artificial intelligent image recognition technology. The intelligent system includes a fault diagnosis module, a slagging/scaling evaluation module, a burner fault detection module and a boiler drum thermal insulation detection module. The four modules include a plurality of detection models in total, the fault diagnosis module includes a fault diagnosis model, the slagging/scaling evaluation module includes a slagging/scaling evaluation model and a pipeline creepage detection model, the burner fault detection module includes a burner fault detection model, and the boiler drum thermal insulation detection module includes a drum thermal insulation detection model. All of the above-mentioned models consist of a convolutional neural network (CNN) model, and data for training the CNN model is the historical operation data of the industrial boiler. Real-time operation data and a corresponding fault are used as a new training set to verify, optimize and retrain the existing model, and thus, the diagnosis accuracy of each of the modules is further improved. The above-mentioned four modules are parallel diagnosis modules, that is, the four modules may work independently.

By using the intelligent system for recognizing and forewarning the fault of the industrial boiler based on the artificial intelligent image recognition technology according to the present disclosure, a fault which will occur (or has occurred) in an operation process of a coal-fired, gas-fired, oil-fired or biomass industrial boiler is recognized, diagnosed and forewarned. Meanwhile, the boiler operation and maintenance personnel may be assisted to rapidly and accurately position, diagnose and evaluate potential problems (scaling condition, combustion condition and thermal insulation condition) of the boiler. In other words, the present disclosure not only serves for a user of the boiler to forewarn and diagnose potential faults to reduce operation risk, but also serves for the operation and maintenance personnel (a boiler manufacturer) to evaluate the health condition of the boiler.

Although the present disclosure has been disclosed as above, the protection scope disclosed by the present disclosure is not limited to this. Various changes and alternations may be made by those skilled in the art without departing from the spirit and scope disclosed by the present disclosure, and these changes and alterations will fall into the protection scope of the present disclosure.

The invention claimed is:

1. A method for recognizing and forewarning a fault of an industrial boiler, applied to an intelligent system for recognizing and forewarning the fault of the industrial boiler, wherein the industrial boiler comprising a plurality of sensors configured to obtain a plurality of boiler monitoring parameters comprising a steam temperature, a steam pressure, a steam flow, a feedwater flow, a feedwater temperature, a water pump, a boiler water level, a burner motor, a furnace pressure, a furnace temperature, a flue gas temperature, a water tank water level, a cooling water inlet temperature and a cooling water outlet temperature;

wherein the method comprises:

acquiring preset boiler monitoring parameter combinations, wherein each of the boiler monitoring parameter combinations comprises at least one boiler monitoring parameter of the plurality of boiler monitoring parameters and each of the boiler monitoring parameter combinations corresponds to a fault type;

acquiring a segmentation time span corresponding to each of the boiler monitoring parameter combinations;

acquiring a variation graph of all the boiler monitoring parameters in each of the boiler monitoring parameter combinations;

segmenting and fragmenting the variation graph of all the boiler monitoring parameters in a time sequence according to the segmentation time span to obtain fragmented images;

obtaining a plurality of fragmented image combinations, wherein each of the fragmented image combinations comprises the fragmented images of all the boiler monitoring parameters within the same time period in each of the boiler monitoring parameter combinations;

respectively inputting the plurality of fragmented image combinations to a preset fault diagnosis model to obtain fault diagnosis results output by the fault diagnosis model and corresponding to all the fragmented image combinations and repairing the faulty boiler based on the fault diagnosis.

2. The method for recognizing and forewarning the fault of the industrial boiler of claim 1, wherein the step of segmenting and fragmenting the variation graph of all the boiler monitoring parameters in a time sequence according to the segmentation time span to obtain fragmented images comprises:

using a sliding window to slide at a preset step length on the variation graph of all the boiler monitoring parameters in a time sequence, and segmenting a region selected by sliding the sliding window on the variation graph of all the boiler monitoring parameters every time into a fragmented image, wherein the width of the sliding window is equal to the segmentation time span.

3. The method for recognizing and forewarning the fault of the industrial boiler of claim 2, wherein before the step of acquiring a segmentation time span corresponding to each of the boiler monitoring parameter combinations, the method further comprises:

acquiring data acquisition time intervals of all the boiler monitoring parameters in each of the boiler monitoring parameter combinations, and determining a first boiler monitoring parameter with the maximum data acquisition time interval in each of the boiler monitoring parameter combinations;

determining the number of preset data acquisition points of the first boiler monitoring parameter in each of the boiler monitoring parameter combinations; and determining the segmentation time span corresponding to each of the boiler monitoring parameter combinations according to the data acquisition time interval of the first boiler monitoring parameter in each of the boiler monitoring parameter combinations and the number of the preset data acquisition points.

4. The method for recognizing and forewarning the fault of the industrial boiler of claim 3, wherein the intelligent system for recognizing and forewarning the fault of the industrial boiler comprises a plurality of detection models, the plurality of detection models comprise the fault diagnosis model and a slagging/scaling evaluation model, and the method for recognizing and forewarning the fault of the industrial boiler further comprises:

acquiring a mineral composition of a to-be-recognized fuel and operation time of the boiler; and inputting the mineral composition of the to-be-recognized fuel and the operation time of the boiler to the slagging/scaling evaluation model, and outputting, by the slagging/scaling evaluation model, a geometric form of ash deposition of the to-be-recognized fuel, wherein the geometric form of the ash deposition comprises at least one of a height, a width, an area and a length-to-width ratio.

5. The method for recognizing and forewarning the fault of the industrial boiler of claim 4, wherein before the step of acquiring a mineral composition of a to-be-recognized fuel and operation time of the boiler, the method further comprises:

acquiring a mineral composition of a fuel used for the boiler;

acquiring an image acquired from each heat exchange surface pipeline of the boiler every other preset time;

detecting an edge of the image acquired from each heat exchange surface pipeline every other preset time to obtain a binary image of an ash deposition form, and acquiring the geometric form of ash deposition based on the binary image of the ash deposition form; and training the slagging/scaling evaluation model by taking the mineral composition of the fuel, the operation time of the boiler and the corresponding geometric form of the ash deposition as training data until a loss function of the slagging/scaling evaluation model is converged.

6. The method for recognizing and forewarning the fault of the industrial boiler of claim 3, wherein the method for recognizing and forewarning the fault of the industrial boiler is applied to an intelligent system for recognizing and forewarning a fault of an industrial boiler, the intelligent system for recognizing and forewarning the fault of the industrial boiler comprises a plurality of detection models, the plurality of detection models comprise the fault diagnosis model and a burner fault detection model, and the method for recognizing and forewarning the fault of the industrial boiler further comprises:

acquiring a flame propagation geometry image; and inputting the flame propagation geometry image to the burner fault detection model, and outputting, by the burner fault detection model, a result whether a burner nozzle has a fault.

7. The method for recognizing and forewarning the fault of the industrial boiler of claim 3, wherein the method for recognizing and forewarning the fault of the industrial boiler is applied to an intelligent system for recognizing and forewarning a fault of an industrial boiler, the intelligent system for recognizing and forewarning the fault of the industrial boiler comprises a plurality of detection models, the plurality of detection models comprise the fault diagnosis model and a drum thermal insulation detection model, and the method for recognizing and forewarning the fault of the industrial boiler further comprises:

acquiring a boiler shutdown temperature, an environmental temperature, a boiler type and boiler shutdown time;

inputting the boiler shutdown temperature, the environmental temperature, the boiler type and the boiler shutdown time to the drum thermal insulation detection model, and outputting, by the drum thermal insulation detection model, a predicted drum temperature distribution cloud image, wherein the drum temperature distribution cloud image comprises temperatures of all components of the boiler; and acquiring an actual drum temperature distribution cloud image of a boiler drum, and determining a heat radiation abnormity part according to the actual drum temperature distribution cloud image and the predicted drum temperature distribution cloud image.

8. The method for recognizing and forewarning the fault of the industrial boiler of claim 3, wherein a model training process of the fault diagnosis model comprises:

acquiring a training image set;

training the fault diagnosis model by taking the training image set as training data to obtain a model training result;

estimating joint distribution of a noise emission label and a true label according to the model training result;

finding out an error sample based on the joint distribution of the noise emission label and the true label, and removing the error sample from the training data; and readjusting a sample category weight of the training data in which the error sample is removed, and retraining the fault diagnosis model until a loss function of the fault diagnosis model is converged.

9. The method for recognizing and forewarning the fault of the industrial boiler of claim 8, wherein after the step of readjusting a sample category weight of the training data in which the error sample is removed, and retraining the fault diagnosis model until a loss function of the fault diagnosis model is converged, the method further comprises:

acquiring newly generated fault data, wherein the newly generated fault data comprises a fault and an image corresponding to the fault; and forming new training data by the fault data and the training image set to train the fault diagnosis model so as to obtain a new model training result, and returning the step of estimating the joint distribution of the noise emission label and the true label according to the model training result based on the new model training result.

10. The method for recognizing and forewarning the fault of the industrial boiler of claim 3, wherein the intelligent system for recognizing and forewarning the fault of the industrial boiler comprises the plurality of detection models, the plurality of detection models comprise the fault diagnosis model and the slagging/scaling evaluation model, and the method for recognizing and forewarning the fault of the industrial boiler further comprises:

acquiring the mineral composition of the to-be-recognized fuel and operation time of the boiler; and inputting the mineral composition of the to-be-recognized fuel and the operation time of the boiler to the slagging/scaling evaluation model, and outputting, by the slagging/scaling evaluation model, the geometric form of ash deposition of the to-be-recognized fuel, wherein the geometric form of the ash deposition comprises at least one of the height, the width, the area and the length-to-width ratio.

11. The method for recognizing and forewarning the fault of the industrial boiler of claim 3, wherein the intelligent system for recognizing and forewarning the fault of the industrial boiler comprises the plurality of detection models, the plurality of detection models comprise the fault diagnosis model and the burner fault detection model, and the method for recognizing and forewarning the fault of the industrial boiler further comprises:

acquiring the flame propagation geometry image; and inputting the flame propagation geometry image to the burner fault detection model, and outputting, by the burner fault detection model, a result whether the burner nozzle has the fault.

12. The method for recognizing and forewarning the fault of the industrial boiler of claim 3, wherein the intelligent system for recognizing and forewarning the fault of the industrial boiler comprises the plurality of detection models, the plurality of detection models comprise the fault diagnosis model and the drum thermal insulation detection model, and the method for recognizing and forewarning the fault of the industrial boiler further comprises:

acquiring the boiler shutdown temperature, the environmental temperature, the boiler type and boiler shutdown time;

inputting the boiler shutdown temperature, the environmental temperature, the boiler type and the boiler shutdown time to the drum thermal insulation detection model, and outputting, by the drum thermal insulation detection model, the predicted drum temperature distribution cloud image, wherein the drum temperature distribution cloud image comprises temperatures of all components of the boiler; and acquiring the actual drum temperature distribution cloud image of the boiler drum, and determining the heat radiation abnormity part according to the actual drum temperature distribution cloud image and the predicted drum temperature distribution cloud image.

13. The method for recognizing and forewarning the fault of the industrial boiler of claim 3, wherein the model training process of the fault diagnosis model comprises:

acquiring the training image set; and training the fault diagnosis model by taking the training image set as training data to obtain the model training result; and estimating joint distribution of the noise emission label and a true label according to the model training result; and finding out the error sample based on the joint distribution of the noise emission label and the true label, and removing the error sample from the training data; and readjusting the sample category weight of the training data in which the error sample is removed, and retraining the fault diagnosis model until the loss function of the fault diagnosis model is converged.

14. The method for recognizing and forewarning the fault of the industrial boiler of claim 2, the intelligent system for recognizing and forewarning the fault of the industrial boiler comprises the plurality of detection models, the plurality of detection models comprise the fault diagnosis model and the slagging/scaling evaluation model, and the method for recognizing and forewarning the fault of the industrial boiler further comprises:

acquiring the mineral composition of the to-be-recognized fuel and operation time of the boiler; and inputting the mineral composition of the to-be-recognized fuel and the operation time of the boiler to the slagging/scaling evaluation model, and outputting, by the slagging/scaling evaluation model, the geometric form of ash deposition of the to-be-recognized fuel, wherein the geometric form of the ash deposition comprises at least one of the height, the width, the area and the length-to-width ratio.

15. The method for recognizing and forewarning the fault of the industrial boiler of claim 2, wherein the intelligent system for recognizing and forewarning the fault of the industrial boiler comprises the plurality of detection models, the plurality of detection models comprise the fault diagnosis model and the burner fault detection model, and the method for recognizing and forewarning the fault of the industrial boiler further comprises:

acquiring the flame propagation geometry image; and inputting the flame propagation geometry image to the burner fault detection model, and outputting, by the burner fault detection model, a result whether the burner nozzle has the fault.

16. The method for the intelligent system for recognizing and forewarning the fault of the industrial boiler comprises the plurality of detection models, the plurality of detection models comprise the fault diagnosis model and the drum thermal insulation detection model, and the method for recognizing and forewarning the fault of the industrial boiler further comprises:

acquiring the boiler shutdown temperature, the environmental temperature, the boiler type and boiler shutdown time;

inputting the boiler shutdown temperature, the environmental temperature, the boiler type and the boiler shutdown time to the drum thermal insulation detection model, and outputting, by the drum thermal insulation detection model, the predicted drum temperature distribution cloud image, wherein the drum temperature distribution cloud image comprises temperatures of all components of the boiler; and acquiring the actual drum temperature distribution cloud image of the boiler drum, and determining the heat radiation abnormity part according to the actual drum temperature distribution cloud image and the predicted drum temperature distribution cloud image.

17. The method for recognizing and forewarning the fault of the industrial boiler of claim 2, wherein the model training process of the fault diagnosis model comprises:

acquiring the training image set; and training the fault diagnosis model by taking the training image set as training data to obtain the model training result; and estimating joint distribution of the noise emission label and a true label according to the model training result; and finding out the error sample based on the joint distribution of the noise emission label and the true label, and removing the error sample from the training data; and readjusting the sample category weight of the training data in which the error sample is removed, and retraining the fault diagnosis model until the loss function of the fault diagnosis model is converged.

18. An intelligent system for recognizing and forewarning a fault of an industrial boiler, comprising:

a memory configured to store executable instructions;

a plurality of sensors configured to obtain a plurality of boiler monitoring parameters comprising a steam temperature, a steam pressure, a steam flow, a feedwater flow, a feedwater temperature, a water pump, a boiler water level, a burner motor, a furnace pressure, a furnace temperature, a flue gas temperature, a water tank water level, a cooling water inlet temperature and a cooling water outlet temperature; and a processor configured to call and execute the executable instructions in the memory to perform operations comprising:

acquiring preset boiler monitoring parameter combinations, wherein each of the boiler monitoring parameter combinations comprises at least one boiler monitoring parameter of the plurality of boiler monitoring parameters, and each of the boiler monitoring parameter combinations corresponds to a fault type;

acquiring a segmentation time span corresponding to each of the boiler monitoring parameter combinations;

acquiring a variation graph of all the boiler monitoring parameters in each of the boiler monitoring parameter combinations;

segmenting and fragmenting the variation graph of all the boiler monitoring parameters in a time sequence according to the segmentation time span to obtain fragmented images;

obtaining a plurality of fragmented image combinations, wherein each of the fragmented image combinations comprises the fragmented images of all the boiler monitoring parameters within the same time period in each of the boiler monitoring parameter combinations;

respectively inputting the plurality of fragmented image combinations to a preset fault diagnosis model to obtain fault diagnosis results output by the fault diagnosis model and corresponding to all the fragmented image combinations and repairing the faulty boiler based on the fault diagnosis.

* * * * *